(12) United States Patent
Inaba

(10) Patent No.: US 10,549,424 B2
(45) Date of Patent: Feb. 4, 2020

(54) SETTING DEVICE AND SETTING SYSTEM FOR CONFIGURING SETTINGS FOR A PLURALITY OF MACHINES

(71) Applicant: FANUC CORPORATION, Minamitsuru-gun, Yamanashi (JP)

(72) Inventor: Ryoutarou Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 2 days.

(21) Appl. No.: 15/799,215

(22) Filed: Oct. 31, 2017

(65) Prior Publication Data

US 2018/0117765 A1 May 3, 2018

(30) Foreign Application Priority Data

Nov. 2, 2016 (JP) ................. 2016-215042

(51) Int. Cl.
*G05B 19/418* (2006.01)
*B25J 9/16* (2006.01)
*G05D 1/02* (2006.01)

(52) U.S. Cl.
CPC .......... *B25J 9/1651* (2013.01); *B25J 9/1682* (2013.01); *G05D 1/0223* (2013.01); *G05B 2219/40202* (2013.01); *Y10S 901/01* (2013.01)

(58) Field of Classification Search
CPC ............. B25J 9/1682; G05B 19/41815; G05B 19/4083; G05B 19/4183; G05B 2219/31073; G05B 2219/31074; G05B 2219/41845; G05B 2219/33125; Y02P 90/18; Y02P 90/16

See application file for complete search history.

(56) References Cited

U.S. PATENT DOCUMENTS

| 9,465,384 | B1* | 10/2016 | Jain ........................... B25J 9/16 |
| 9,561,590 | B1* | 2/2017 | Nusser .................... B25J 9/1661 |
| 9,672,184 | B1* | 6/2017 | Jain ........................ G06F 13/409 |
| 2010/0191372 | A1* | 7/2010 | Nihei ..................... B25J 9/1676 |
| | | | 700/245 |

(Continued)

FOREIGN PATENT DOCUMENTS

CN 101890556 A 11/2010
CN 105989191 A 10/2016

(Continued)

*Primary Examiner* — Dale Moyer
(74) *Attorney, Agent, or Firm* — RatnerPrestia

(57) ABSTRACT

A setting device and a setting system capable of obtaining information other than a configuration of a machine, and of configuring an appropriate setting for the machine. The setting system includes a plurality of installation areas, at least one machine each being located at one of the installation areas, and a setting device. The setting device has: an obtaining section configured to, when at least one of the machines is moved from a first installation area to a second installation area, obtain configuration data regarding the configuration of the moved machine and the area data regarding the second installation area; and a transmitting section configured to transmit previously prepared setting information to the moved machine, wherein the setting information corresponds to a combination of the configuration data of the moved machine and the area data of the second installation area.

6 Claims, 1 Drawing Sheet

(56) References Cited

U.S. PATENT DOCUMENTS

| | | | | |
|---|---|---|---|---|
| 2010/0211220 | A1* | 8/2010 | Nishi | G05B 19/41825 700/248 |
| 2011/0285499 | A1* | 11/2011 | Nakamachi | G05B 19/4188 340/3.32 |
| 2013/0116880 | A1 | 5/2013 | Shitamoto et al. | |
| 2015/0032256 | A1* | 1/2015 | Hashiguchi | G05B 19/41845 700/248 |
| 2015/0198938 | A1* | 7/2015 | Steele | G05B 15/02 700/275 |

FOREIGN PATENT DOCUMENTS

| | | | |
|---|---|---|---|
| JP | 2004237364 A | | 8/2004 |
| JP | 2009294965 A | * | 12/2009 |
| JP | 5018774 B | | 9/2012 |
| JP | 2014073540 A | | 4/2014 |
| WO | 2012008085 A1 | | 1/2012 |
| WO | WO 2016/030968 A1 | | 3/2016 |

* cited by examiner

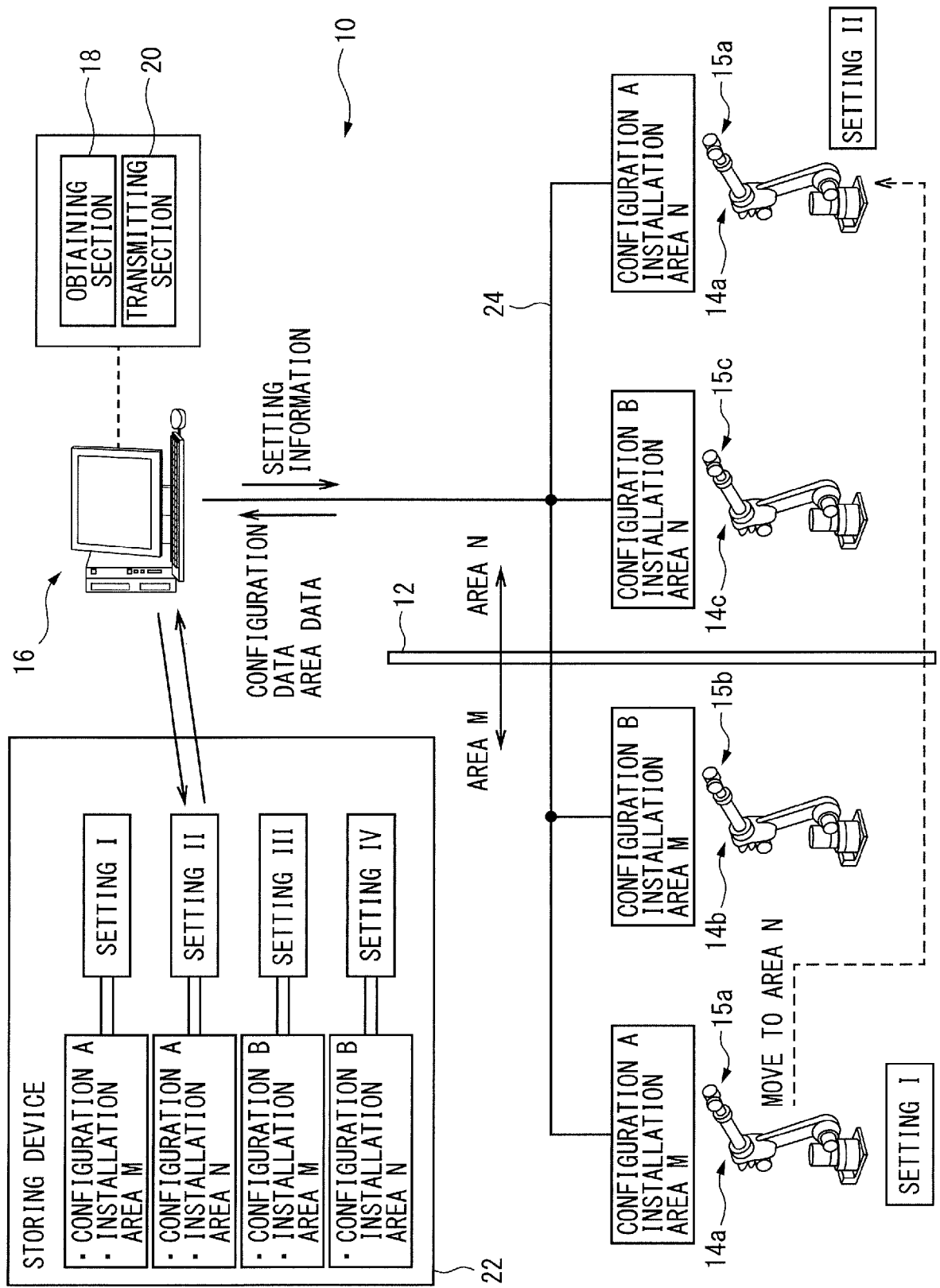

SETTING DEVICE AND SETTING SYSTEM FOR CONFIGURING SETTINGS FOR A PLURALITY OF MACHINES

CROSS-REFERENCE TO RELATED APPLICATIONS

This application is a new U.S. Patent Application that claims benefit of JP 2016-215042, filed Nov. 2, 2016, the disclosure of which is being incorporated herein by reference in its entirety for all purposes.

BACKGROUND OF THE INVENTION

1. Field of the Invention

The preset invention relates to a setting device for configuring predetermined settings for a plurality of machines such as robots or machine tools, and also relates to a setting system including the setting device.

2. Description of the Related Art

In a conventional system including a plurality of machines such as robots or machine tools, depending on a change in a type of a product manufactured by the system, a configuration of the system may be changed, for example, by exchanging a part of the machines included in the system, or by shifting some of the machines. As a relevant prior art document, WO 2016/030968 A1 discloses a machine management device for managing a plurality of machines, in which each machine has one or more exchangeable unit so that plural types of unit configurations can be obtained by exchanging or reassembling the units. Further, WO 2016/030968 A describes that appropriate setting information can be set for each machine depending on a combination of the unit configurations.

On the other hand, JP 5018774 B discloses a device and method for monitoring an information processing system, in which data can be transmitted/received or shared via an internet. Further, JP 5018774 B describes that, in view of that a large information processing system includes a plurality of devices to be monitored having the same or similar hardware and software configurations to which the same monitoring setting information can be applied, a diverting condition including hardware and software configurations is previously set; it is mechanically judged as to whether monitor setting information of a device to be monitored can be used for another device to be monitored, based on the diverting condition and monitoring data representing the hardware and software configurations of each device to be monitored; and the result of judgment is provided to a system administrator.

In WO 2016/030968 A1 or JP 5018774 B, it can be understood that, by using the data regarding the hardware and software configurations of the device constituting the system, the setting of one device may be diverted or used to another device having the same or similar configuration. However, even if the hardware and software configurations of the devices are the same, the different settings should be used for the devices when installation sites thereof are different from each other. Such a case cannot be appropriately handled by the prior art.

For example, a robot capable of carrying out a manual work is often repositioned (shifted) due to production adjustment, etc. Such a robot is required to have a versatile configuration so as to carry out various operations. As a result, a plurality of robots having the same configuration may be prepared. However, when the same setting is diverted to each robot having the same configuration, it is difficult to configure an appropriate setting for each operation.

SUMMARY OF THE INVENTION

Therefore, an object of the present invention is to provide a setting device and a setting system capable of obtaining information other than a configuration of a machine, and of configuring an appropriate setting for the machine.

One aspect of the present invention provides a setting device for configuring a setting regarding a function and motion of each of a plurality of machines, the setting device comprising: an obtaining section configured to, when at least one of the plurality of machines is moved from a first installation area to a second installation area, obtain configuration data regarding a configuration of the moved machine and area data regarding the second installation area, from the moved machine; and a transmitting section configured to transmit previously prepared setting information regarding the function and motion of the moved machine, to the moved machine, wherein the setting information corresponds to a combination of the configuration data regarding the configuration of the moved machine and the area data regarding the second installation area.

In a preferred embodiment, the configuration of the machine includes a sensor, and the setting information includes a setting regarding at least one of: an obtaining frequency of measurement data measured by the sensor; a measurement accuracy of the measurement data; and a transmission frequency of the measurement data to the setting device.

The machine may be a self-propelled machine, and in this case, at least one of the installation areas may be set as an cooperation area where both the machine and an operator may enter, and the setting information may include a setting in which, in case that the machine enters the cooperation area, the machine travels or moves at a lower velocity when the operator exists in the cooperation area, than when the operator does not exist in the cooperation area.

Otherwise, the machine may be a self-propelled machine having a function for recognizing an operator, and in this case, at least one of the installation areas may be set as an cooperation area where both the machine and an operator may enter, and wherein the setting information may include a setting in which, in case that the machine enters the cooperation area, at least one of a velocity, an accuracy and a distance for recognizing the operator is changed between when the operator exists in the cooperation area and when the operator does not exist in the cooperation area.

Another aspect of the present invention provides a setting device for configuring a setting regarding a function and motion of each of a plurality of machines, the setting device comprising: an obtaining section configured to, when at least one of the plurality of machines is moved from a first installation area to a second installation area, obtain area data regarding the second installation area, from the moved machine; and a transmitting section configured to transmit previously prepared setting information regarding the function and motion of the moved machine, to the moved machine, wherein the setting information corresponds to a combination of configuration data regarding a configuration of the machine capable of being operated in the second installation area and the area data regarding the second installation area.

Still another aspect of the present invention provides a setting system, comprising: the above setting device; and a storing device configured to store the setting information as information which is associated with: configuration data regarding respective configurations of the plurality of machines; area data regarding a plurality of installation areas where the plurality of machines may be installed; and a plurality of combinations of the configuration data and the area data.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 1 shows a schematic configuration of a setting system including a setting device according to a preferred embodiment of the present invention.

DETAILED DESCRIPTIONS

FIG. 1 schematically shows an example of a constitution of a setting system, including a setting device according to a preferred embodiment of the present invention and a storing device as explained below. Setting system 10 includes: a plurality of (in the drawing, two) installation areas defined by a partition 12, etc.; at least one machine (in the drawing, three robots 14a, 14b and 14c) each being located at one of the installation areas; and a setting device (or a server) 16 configured to configure or generate a predetermined setting for each machine regarding the function and motion thereof.

Herein, the plurality of (or distinct) installation areas may include plural areas visually divided by a simple tape or a white line, etc., or plural areas virtually divided, as well as the areas divided by a physical wall, fence or shutter such as partition 12. Therefore, even when there is one area having no visual or actual partition, etc., this area will be treated as distinct installation areas, after the area is virtually divided by arithmetic processing of server 16, etc., based on a predetermined condition.

For example, each of machines 14a, 14b and 14c is an articulated robot, a machine tool or a production machine. At least one of the machines is configured to move or shift between the plurality of installation areas. These machines have at least two types of configurations different from each other. In the example of FIG. 1, first robot 14A having a first configuration (configuration A) and second robot 14B having a second configuration (configuration B) are positioned in the first installation area (area M), and third robot 14C having the second configuration (configuration B) is positioned in the second installation area (area N).

Each of configurations A and B includes information regarding at least one of hardware and software of each machine. For example, the hardware configuration may include sensors 15a, 15b and 15c (e.g., a temperature sensor, a dust sensor, a humidity sensor or a mist sensor) which are respectively provided to machines 14a, 14b and 14c, or a combination of the sensors. For example, the software configuration may include a program for controlling the above sensor.

In the present embodiment, the phase that "the configurations are the same" means that the hardware configuration and the software configuration included in configurations A and B, etc., are the same, and does not always mean that all of the components constituting the machine such as the robot are the same. In other words, the configurations of the machines are considered to be the same as long as all of the components (the above sensor, etc.) regarding the setting information are the same between the machines.

Setting device 16 has: an obtaining section 18 configured to, when at least one of the plurality of machines (in the drawing, robot 14a) is moved from first installation area M to second installation area N, obtain configuration data regarding the configuration of the moved machine (robot 14a) and the area data regarding second installation area N (or the destination); and a transmitting section 20 configured to transmit previously prepared (in the embodiment, stored in a storing device 22 as explained below) setting information to the moved machine (robot 14a), wherein the setting information corresponds to a combination of the configuration data of the moved machine (robot 14a) and the area data of second installation area N.

The setting information may be stored in storing device 22 such as a database, wherein the setting information is associated with: the configuration data regarding the respective configurations of the plurality of machines; the area data regarding the installation areas where the plurality of machines may be installed; and the plurality of combinations of the configuration data and the area data.

For example, setting device 16 is a personal computer, and obtaining section 18 and/or transmitting section 20 may be realized by a processor or a communication module, etc., of the personal computer. Alternatively, setting device 16 may be identical to a controller of machine 14. In the embodiment of FIG. 1, storing device 22 is illustrated as a device distinct from setting device 16, whereas storing device 22 may be configured as a memory or hard disk, and may be provided to (incorporated in) the personal computer.

As shown in FIG. 1, each machine (robot), setting device 16 and storing device 22, which are included in setting system 10, may be communicably connected to each other via a network 24 such as an intranet, or may be configured to communicate with each other by radio. Although the data or information can be communicated between each machine by network 24 or by radio, the other means may be used for the communication.

Next, the procedure in the system of FIG. 1 will be explained. In the embodiment, robot 14a installed in first area M is moved or shifted to second area N. In addition to or instead of robot 14a, another robot may be shifted to second area N, such a case may be operated similarly.

First, from robot 14a, setting device 16 obtains the configuration data of robot 14a moved to second installation area N and the area data of second installation area N. In this regard, configuration data may include information regarding at least one of the hardware and the software of the machine, and the area data may include the location and size of the corresponding area in the factory, etc., and the installation position of the objective machine (in this case, robot 14a) in the corresponding area, etc.

Next, setting device 16 searches and obtains the setting information from storing device 22, wherein the setting information is associated with the combination of the configuration data of robot 14a and the area data of second installation area N. In the example of FIG. 1, setting information I, II, III and IV are respectively associated with combinations of the two types of configurations (A, B) and two types of installation areas (M, N), and are previously stored in storing device 22. Further, setting device 16 reads setting information II, associated with the combination of configuration A and installation area N, from storing device 22. As a concrete example of the setting information, at least one of: an obtaining frequency of measurement data measured by the sensor provided to each machine; a measurement accuracy of the measurement data; and a transmission frequency of the measurement data to setting device 16 (or the server), may be used.

Next, setting device 16 transmits and applies the setting information (in this embodiment, setting II), read out from storing device 22, to robot 14a. Robot 14a or the controller thereof is operated based on the setting information received from setting device 16. For example, when the sensor includes a temperature sensor or a dust sensor, the setting information may include that temperature data or dust data should be transmitted to the server with high frequency at the installation area having a severe environmental condition. Such the temperature data or the dust data can be utilized for operating or adjusting air-conditioning equipment, etc. In this regard, when the data should be obtained with high frequency, the accuracy of the data or the transmission frequency of the obtained data may be lowered, thereby a memory of the setting device and/or (the controller of) the robot can be saved. Further, when robot 14a has a unit constituted by plural sensors, the setting information may include that the type of sensor to be used should be changed depending on which installation area robot 14a is installed or where in the installation area robot 14a is located.

The robot used in the embodiment may be or may not be a self-propelled machine. When the robot is not the self-propelled machine, it is preferable that the robot be configured so as to be easily moved by a human power or a carriage, etc. Such a robot can be used, for example, as a supplemental robot when an urgent production increase is required but staffs are short. In particular, the robot can be used for complementing a production process which requires an operator in the daytime, and the robot can perform a simple operation which can be done by the same robot only during the night, etc.

With respect to the transmitting or receiving the installation area data, each machine such as the robot may have a position sensor, etc., configured to detect the installation location of the machine and transmit data regarding the installation location to the setting device. Alternatively, a means for detecting the installation location of the robot may be arranged at a place in each installation area where the robot is operated. For example, an RFID tag storing the positional information may be arranged, the positional information may be stored in a power cable, and/or the physical place may be stored in a network apparatus positioned between the server and the installation area. Alternatively, the operator may select the installation area data from a map, etc.

The area data obtained by setting device 16 from the machine such as robot 14a may include only the name of the installation area (in the embodiment, "M" and "N"). In this regard, the area data may also include the concrete installation location of the robot in the installation area, and in this case, unique setting information of the installation location may be previously stored in storing device 22. For example, when working areas of the machine are limited to specified areas in the factory, and when the configuration of the robot used in each working area is limited to one type, storing device 22 may store setting information formed by combining data of the specified area (or the area data) and the configuration data of the robot operable in the corresponding specified area. By virtue of this, after setting device 16 obtains only the area data regarding the destination of the moved robot 14a (or the specified area), setting device 16 can transmit the setting information corresponding to the destination to robot 14a, without obtaining the configuration data.

In this case, setting device 16 may compare the setting information transmitted to moved robot 14a with the actual hardware and/or software of robot 14a. Then, if there is any excess or deficiency in robot 14a, the excess or deficient hardware and/or software may be displayed on a screen, etc. Therefore, as long as the relationship between the specified area and the hardware configuration and/or the software configuration required for the operation at the specified area, and the hardware configuration and/or the software configuration of the excess robot are managed, the setting device (or the server) can previously recognize as to which robot should be installed at the specified area, thereby the efficiency of the entire factory can be improved. In this regard, it is preferable that the excess robot and the configuration thereof be previously registered in the network, etc., and the registered content be timely updated when it is changed offline, etc.

As another embodiment, when the machine such as the robot is a self-propelled machine (i.e., the machine has a structure or power for moving the machine, and the machine can move based on a predetermined command, etc.), the machine can be used to automatically take out or put a product from or on a shelf, and transport the product, etc. In such a case, (the controller of) the self-propelled machine may recognize map information of the entire installation area such as the factory, and information regarding the current position of the robot.

At least one of the plurality of installation areas may include a predetermined cooperation area where both the machine such as the robot and the operator can enter, and the self-propelled machine may enter the cooperation area and may be operated in the cooperation area. In such a case, server 16 may use a camera or a human detector, etc., so as to recognize as to whether or not the operator exists in the cooperation area, and may transmit setting information regarding the cooperation to the self-propelled machine, in addition to or instead of the setting information regarding the sensor as explained above. In particular, in case that the self-propelled robot enters the cooperation area, server 16 may transmit setting information to the robot so that the robot travels or moves at a lower velocity (more concretely, the velocity of each axis of the robot arm, the velocity of a front end of the robot arm, and the velocity of the tool center point are lowered) when the operator exists in the cooperation area, than when the operator does not exist in the cooperation area, thereby the setting regarding the velocity of the self-propelled robot can be changed. Further, in case that the machine has the camera of the human detector having the function for recognizing the operator, server 16 may transmit setting information to the machine so that at least one of a velocity, an accuracy and a distance (or range) for recognizing (or capable of recognizing) the operator is changed (normally, increased) when the operator exists in the cooperation area, in comparison to when the operator does not exist in the cooperation area.

As described above, the installation area may be divided by the physical shutter or fence. Alternatively or additionally, a virtual boundary may be used in a place (such as a large storehouse) having no partition, so as to divide the installation area. In this regard, when the self-propelled robot is used, an area adjacent to the (cooperation) area where the operator may enter may be virtually defined, and then, for the safety of the operator, the setting information may be provided with a command so that the self-propelled robot is operated at a low velocity when the robot enters the area adjacent to the cooperation area. Also in this case, it is preferable that the human detector, etc., for detecting the existence or the position of the operator be arranged at an appropriate place.

In the above embodiment, the setting device is configured to obtain the setting information and transmit it the machine, in which the setting information corresponds to or is associated with the area data of the installation area where the machine such as the robot is installed. Therefore, the possibility, that the setting information regarding the different installation area is transmitted to the robot, can be eliminated. Accordingly, each machine can carry out various processes or motions depending on the installation area, thereby the production efficiency may be improved and/or the production management can be facilitated, in the factory, etc., including the plurality of machines having the same configuration.

According to the present disclosure, by obtaining the information of the installation (operation) area and/or the installation location of the machine, as well as the information regarding the hardware and software of the machine, the different setting information can be transmitted to the machines having the same configuration, which are installed in the different installation areas. Therefore, the setting can be appropriately diverted or used to the respective machine.

While the invention has been described with reference to specific embodiments, it will be understood, by those skilled in the art, that various changes or modifications may be made thereto without departing from the scope of the following claims.

The invention claimed is:

1. A setting device for configuring a setting regarding a function and motion of each of a plurality of machines, the setting device comprising:
   a processor configured to:
      when at least one of the plurality of machines is moved from a first installation area to a second installation area, obtain configuration data regarding a configuration of the moved machine and area data regarding the second installation area, from the moved machine;
      comparing the obtained combination of the obtained configuration data and the obtained area data to a plurality of stored combinations of stored configuration data and stored area data to determine a stored combination of stored configuration data and stored area data that matches the obtained combination of the obtained configuration data and the obtained area data;
      select previously prepared setting information associated with the stored combination that matches the obtained combination, the previously prepared setting information regarding the function and motion of the moved machine; and
      transmit the selected previously prepared setting information to the moved machine.

2. The setting device as set forth in claim 1, wherein the configuration of the machine includes a sensor, and the setting information includes a setting regarding at least one of: an obtaining frequency of measurement data measured by the sensor; a measurement accuracy of the measurement data; and a transmission frequency of the measurement data to the setting device.

3. The setting device as set forth in claim 1, wherein the machine is a self-propelled machine,
   wherein at least one of the installation areas is set as an cooperation area where both the machine and an operator may enter, and
   wherein the setting information includes a setting in which, in case that the machine enters the cooperation area, the machine travels or moves at a lower velocity when the operator exists in the cooperation area, than when the operator does not exist in the cooperation area.

4. The setting device as set forth in claim 1, wherein the machine is a self-propelled machine having a function for recognizing an operator,
   wherein at least one of the installation areas is set as an cooperation area where both the machine and an operator may enter, and
   wherein the setting information includes a setting in which, in case that the machine enters the cooperation area, at least one of a velocity, an accuracy and a distance for recognizing the operator is different between when the operator exists in the cooperation area and when the operator does not exist in the cooperation area.

5. A setting device for configuring a setting regarding a function and motion of each of a plurality of machines, the setting device comprising:
   a processor configured to:
      when at least one of the plurality of machines is moved from a first installation area to a second installation area, obtain area data regarding the second installation area, from the moved machine;
      comparing the obtained area data to a plurality of stored combinations of stored configuration data and stored area data to determine a stored combination of stored configuration data regarding a configuration of the machine capable of being operated in the second installation area and stored area data regarding the second installation area that matches the obtained area data;
      select previously prepared setting information associated with the stored combination that matches the obtained area data, the previously prepared setting information regarding the function and motion of the moved machine; and
      transmit the selected previously prepared setting information to the moved machine.

6. The setting device of claim 1, further comprising:
   a memory device configured to store the setting information as information which is associated with:
   configuration data regarding respective configurations of the plurality of machines;
   area data regarding a plurality of installation areas where the plurality of machines may be installed; and
   a plurality of combinations of the configuration data and the area data.

* * * * *